(12) United States Patent
Sojka et al.

(10) Patent No.: US 11,996,528 B2
(45) Date of Patent: May 28, 2024

(54) METHOD TO OPEN UP ELECTRO CHEMICAL ENERGY STORAGE DEVICES AND THERMAL TREATMENT SYSTEM

(71) Applicant: Accurec Recycling GmbH, Krefeld (DE)

(72) Inventors: Reiner Sojka, Düsseldorf (DE); Albrecht Melber, Darmstadt (DE)

(73) Assignee: ACCUREC RECYCLING GMBH, Krefeld (DE)

( * ) Notice: Subject to any disclaimer, the term of this patent is extended or adjusted under 35 U.S.C. 154(b) by 390 days.

(21) Appl. No.: 17/118,305

(22) Filed: Dec. 10, 2020

(65) Prior Publication Data

US 2021/0184284 A1    Jun. 17, 2021

(30) Foreign Application Priority Data

Dec. 11, 2019  (DE) ...................... 10 2019 133 914.6

(51) Int. Cl.
*H01M 10/54* (2006.01)
*B09B 3/40* (2022.01)
(Continued)

(52) U.S. Cl.
CPC ............. *H01M 10/54* (2013.01); *B09B 3/40* (2022.01); *C22B 1/005* (2013.01); *F27B 9/045* (2013.01);
(Continued)

(58) Field of Classification Search
CPC ..... H01M 10/54; H01M 10/0525; B09B 3/40; C22B 1/005; F27B 9/045; F27B 9/06;
(Continued)

(56) References Cited

U.S. PATENT DOCUMENTS

| 5,735,933 A | 4/1998 | Yokoyama et al. |
| 2008/0050295 A1 | 2/2008 | Uchida et al. |

(Continued)

FOREIGN PATENT DOCUMENTS

| CN | 108565523 A | 9/2018 | |
| CN | 108899602 A | * 11/2018 | ............... B03C 1/30 |

(Continued)

OTHER PUBLICATIONS

English translation of JP-2016022395-A, dated Dec. 23, 2022 (Year: 2022).*

(Continued)

*Primary Examiner* — Edelmira Bosques
*Assistant Examiner* — Brett Peterson Mallon
(74) *Attorney, Agent, or Firm* — Polson Intellectual Property Law P.C.; Margaret Polson; Christopher Sylvain

(57) ABSTRACT

A method for opening up electrochemical energy storage devices in connection with a subsequent recovery of valuable materials contained therein as secondary raw materials, in which method the energy storage devices are opened up by a thermal treatment system to remove the electrolytes and reactive substances, before the thermally treated material is subjected to processing, whereby secondary raw materials in the thermally treated material are separated from one another. The thermal treatment is performed in an indirectly heated furnace under atmospheric pressure conditions or a slight overpressure relative to the ambient pressure of up to 20 mbar in a reducing atmosphere, and influence is exerted on the course of the thermal treatment process via the reducing atmosphere, as a control variable. Furthermore, a thermal treatment system is described for removing electrolytes and reactive substances in electrochemical energy storage devices and consequently for pyrolytic opening.

13 Claims, 1 Drawing Sheet

(51) Int. Cl.
  *C22B 1/00* (2006.01)
  *F27B 9/04* (2006.01)
  *F27B 9/06* (2006.01)
  *F27B 9/40* (2006.01)
  *F27D 9/00* (2006.01)
  *F27D 17/00* (2006.01)
  *H01M 10/0525* (2010.01)

(52) U.S. Cl.
  CPC ............ *F27B 9/06* (2013.01); *F27B 9/40* (2013.01); *F27D 17/001* (2013.01); *F27D 17/008* (2013.01); *H01M 10/0525* (2013.01); *F27D 2009/007* (2013.01)

(58) Field of Classification Search
  CPC ........ F27B 9/40; F27D 17/001; F27D 17/008; F27D 2009/007
  See application file for complete search history.

(56) References Cited

U.S. PATENT DOCUMENTS

| | | | |
|---|---|---|---|
| 2014/0017621 A1 | 1/2014 | Iida et al. | |
| 2015/0147709 A1 | 5/2015 | Isomura et al. | |
| 2018/0026318 A1 | 1/2018 | Shin et al. | |
| 2019/0260101 A1* | 8/2019 | Hanisch | C22B 7/001 |

FOREIGN PATENT DOCUMENTS

| | | | |
|---|---|---|---|
| CN | 109193058 A | * | 1/2019 |
| CN | 109193058 A | | 1/2019 |
| CN | 109888370 A | | 6/2019 |
| JP | 20122229481 A | | 11/2012 |
| JP | 2016022395 A | * | 2/2016 |
| JP | 2016022395 A | | 2/2016 |
| JP | 2016022395 A | | 8/2016 |

OTHER PUBLICATIONS

English translation of CN-109193058-A, dated Dec. 23, 2022 (Year: 2022).*
English translation of CN-109193058-A, dated Feb. 10, 2023 (Year: 2024).*
Office Action dated Aug. 5, 2020 in related German application DE2019133914.6.
Accurec Recycling Gesellschaft mbH: Weyhe, R. T.; Melber, A.: Demonstration system for a cost-neutral, resource-efficient processing of disused Li-Ion batteries for electromobility—EcoBatRec: Final report on the joint project. Mülheim, 2016. https://doi.org/10.2314/GBV:872637352.
U.S. Appl. No. 17/118,295, filed Dec. 10, 22020, applicant Accurec Recycling GmbH. Per MPEP rule 609.07, copy not provided as this is available in the USPTO system.
Extended European Search Report dated Apr. 21, 2021 in related German application EP20211167.0.
Examination report dated Feb. 3, 2023 in related European application 20211167.0.
Examination report dated Feb. 16, 2024 in related German application 10 2019 133 914.6.

* cited by examiner

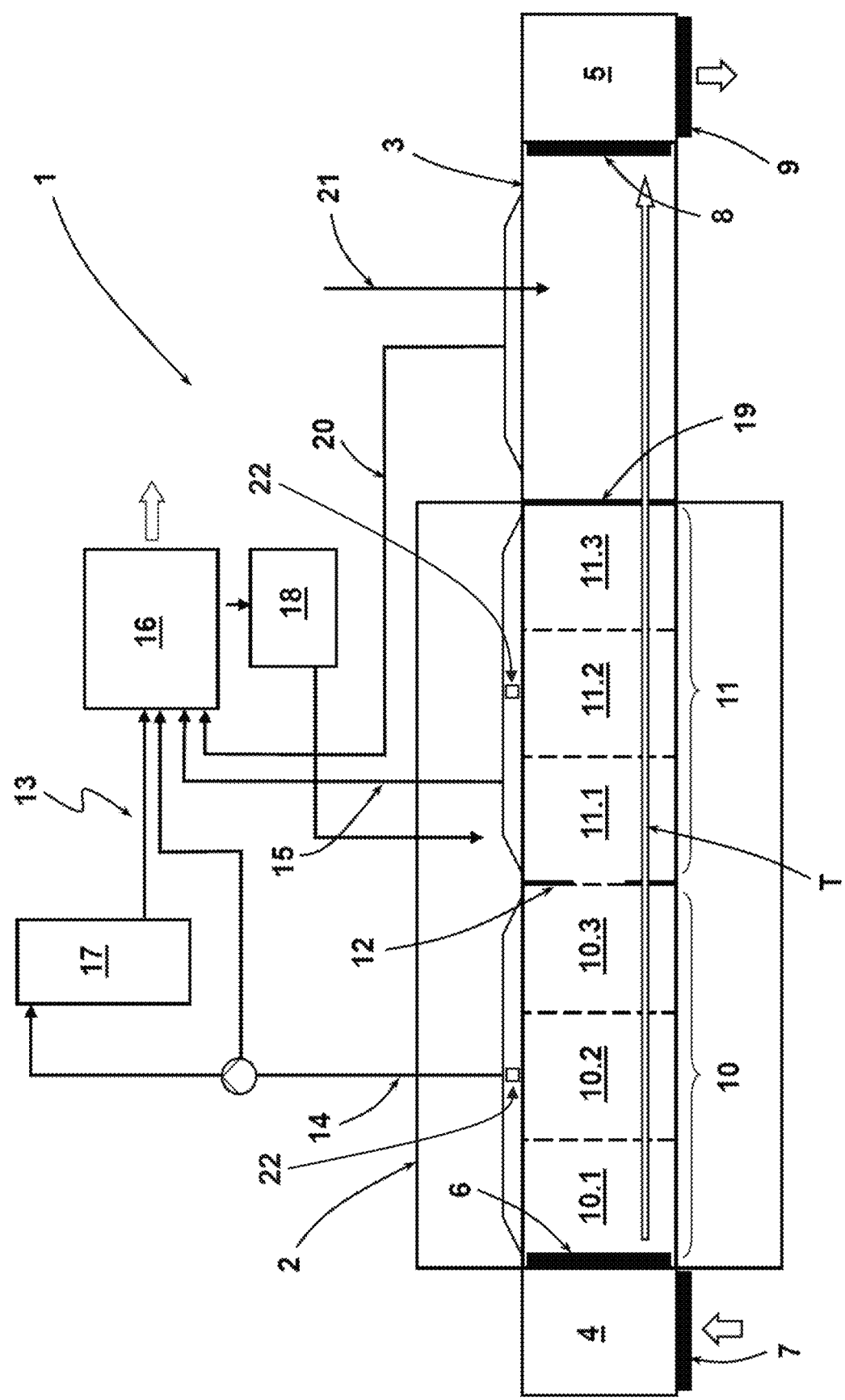

METHOD TO OPEN UP ELECTRO CHEMICAL ENERGY STORAGE DEVICES AND THERMAL TREATMENT SYSTEM

CROSS REFERENCE APPLICATIONS

This application is a non-provisional application claiming priority to German application no. 10 2019 133 914.6 filed Dec. 11, 2019, which is hereby incorporated by reference for all purposes.

BACKGROUND

The disclosure relates to a method for opening up electrochemical energy storage devices in connection with a subsequent recovery of valuable materials contained therein as secondary raw materials. With this method the energy storage devices are opened up with a thermal treatment system to remove the electrolytes and reactive substances thereby secondary raw materials in the thermally treated material are separated from one another before the thermally treated material is subjected to processing. Further described is a thermal treatment system for thermal opening of electrochemical energy storage devices.

Electrochemical energy storage devices are rechargeable batteries, such as lithium-ion batteries, nickel-metal hydride batteries, and electrolytic capacitors. Such energy storage devices, in particular lithium-ion batteries, are used as so-called stand-alone batteries, but to a greater extent also in the form of battery modules for operating electrical consuming units, such as mobile computers, cell phones, power tools, and, increasingly, also in connection with electromobility, particularly in relation to motor vehicles. The electrochemical energy storage devices that are used for motor vehicles must have a high storage density and be able to store the required power. In many cases, these energy storage devices are high-voltage batteries.

The increasing use of such electrochemical energy storage devices, which can be observed worldwide, especially in connection with the increasing electromobility, leads to a growing number of disused energy storage devices, so-called end-of-life batteries or battery modules. The higher production rates to meet the increased demand have the consequence that production waste also increases in terms of quantity. In addition, the natural resources are limited from which the elements required to manufacture such energy storage devices are obtained. Against this backdrop, various approaches have been proposed to recover the raw materials contained therein as secondary raw materials from the no-longer-usable electrochemical energy storage devices— namely end-of-life batteries or battery modules as well as production waste. In order for such a method to become established on the market, it must be controllable and feasible at reasonable costs. In addition, such a method must be suitable for treating larger quantities as well, such as several 1,000 tonnes (t) per year.

The thermal reactivity is not unproblematic in such electrochemical energy storage devices, in particular when they are lithium-ion batteries. Damage to such an energy storage device can easily lead to ignition of same. Due to their design, such energy storage devices can contain a relatively high residual charge. So that subsequent decomposing steps can be carried out safely, the electrochemical energy storage devices must first be deactivated by discharging. This is done through an actively induced discharge process. For this purpose, the energy storage devices are placed, for example, in a discharge liquid or in discharge granules. In order to ensure discharge in the discharge liquid, the energy storage devices must first be opened mechanically so that the discharge liquid can penetrate into the housing, since the battery or battery module contacts oxidize in the discharge liquid and stop the desired discharge process after a short time. It is also known to use the thermal reactivity of the energy storage devices in connection with a thermal treatment of same. In this way, at least part of the energy required for thermal (pyrolytic) treatment of the energy storage devices can be drawn therefrom.

For the thermal treatment of electrochemical energy storage devices, a vacuum furnace can be used, in which the thermal opening takes place. Operation is only possible in batches. Directly heated rotary kilns, by means of which the energy storage devices to be opened up are transported, are sometimes used for the thermal opening of the energy storage devices. The throughput at which such a rotary kiln can be operated is dependent on the amount of energy storage supplied due to the thermal reactivity of the energy storage devices to be opened up. If the thermal treatment is only to be carried out up to a certain maximum temperature, for example so that the metals to be recovered (which also includes the transition metals) do not melt, which is preferred for the downstream processing of the pyrolytically opened energy storage devices, the throughput is limited. The secondary raw materials to be recovered, especially the transition metals such as iron, nickel, and cobalt, are mostly in oxide form at the end of the thermal treatment and are used in this form in the downstream processing.

JP 2016-22395 A discloses a method and a device for recycling old lithium-ion batteries, in which the unopened old batteries are placed in a refractory container and brought into a heat treatment furnace with the refractory container. The old batteries are heated in the heat treatment furnace and volatile electrolyte solutions escape from the refractory container into the heat treatment furnace. The formation of the volatile gases in the refractory container and the escape of these gases into the heating furnace creates a reducing atmosphere in the refractory container which counteracts an explosion of the lithium-ion batteries in the furnace. In addition to the electrolyte solution in the old batteries, flammable substances such as plastics are also thermally opened up and transferred to the furnace. These substances can be burned in the furnace and contribute to heating the furnace. The furnace temperature is regulated by controlling the amount of oxygen supplied. To control the temperature and pressure in the furnace, the furnace has a temperature sensor and a pressure sensor and a corresponding temperature control and pressure control.

Another method and a treatment device for a battery pack, which enable a safe recycling process to be carried out, are disclosed in US 2014/0017624 A1. The previously known treatment device has a furnace for heating the battery pack, a supply unit for providing a substitute gas that is let into a space of the furnace and replaces the atmosphere present there, and a condenser. Steam or an inert gas, for example, can be supplied as the substitute gas, whereby a reducing atmosphere is obtained in the furnace. The resulting thermolysis products are conveyed from the furnace to the condenser via a pipe system and condensed there. The resulting condensate liquid is transferred to a waste liquid tank and further processed or burned there, if necessary.

CN 109193058 A describes a multi-stage pyrolysis method for processing lithium-ion batteries. In this method, dismantled lithium-ion batteries are placed in a continuous furnace and preheated to a low temperature. Pyrolysis is then carried out at temperatures between 250° C. and 500° C., followed by cooling of the batteries to 100° C. The individual pyrolysis steps take place under negative pressure and in an oxygen-free environment. The flue gases produced during pyrolysis are captured and transferred to a secondary combustion process. The flue gas is then processed in order to remove existing acids, pollutants, and dusts from the flue gas.

A method and a device for the thermal treatment of old batteries are also described in U.S. Pat. No. 5,735,933 A. Metallic substances can be recovered from the batteries and converted into non-harmful residues. U.S. Pat. No. 5,735,933 A discloses two different devices for this purpose, which are provided for evaporating waste batteries in a vacuum furnace, in which the furnace temperature can be increased gradually in order to evaporate the metallic coating structures and non-metals contained in the battery, which form the sealed structures of the batteries. The evaporation gases of the materials, which develop in stages with each temperature level reached, are suctioned out of the furnace by means of a vacuum and then collected and separated. For this purpose, the device has a heat treatment furnace, a vacuum pump for extracting the metal vapor and/or non-metal gases from the furnace, evacuation means, non-oxidizing gas supply means, non-oxidizing high-temperature gas storage means, collecting means and condensation means for the metal vapor, and collecting means and absorption means for non-metal vapors.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Starting from the prior art discussed at the beginning, the disclosure is based on the aspect of optimizing the process of opening up electrochemical energy storage devices, in particular lithium-ion batteries, with a view to improving the cost-benefit ratio.

This aspect is achieved according to the disclosure by means of a generic method mentioned at the outset, in which the thermal treatment is carried out in an indirectly heated furnace under atmospheric pressure conditions or a slight overpressure as compared to the ambient pressure of up to 20 mbar, and in a reducing atmosphere, and in which influence is exerted on the course of the thermal treatment process via the reducing atmosphere, as a control variable.

This aspect is also achieved through of a thermal treatment system for removing electrolytes and reactive substances in electrochemical energy storage devices for carrying out the aforementioned method, comprising an indirectly heated furnace with at least one thermal treatment chamber that is atmospherically separated from the furnace environment;
at least one lock for supplying the treatment chamber and for removing the thermally treated material;
a heating device for the indirect supply of heat into the treatment chamber;
a suction device for suctioning off gaseous evaporation and decomposition products that develop during the thermal treatment of the electrochemical energy storage devices in the treatment chamber;
a thermal post-combustion system to clean the gases suctioned out of the treatment chamber by the suction device with heat recovery, the recovered heat being used to heat the treatment chamber; and
a device for monitoring the atmosphere prevailing in the treatment chamber with regard to reducing atmospheric conditions desired therein.

In this method the thermal opening of the electrochemical energy storage devices takes place in an indirectly heated furnace, at least largely under atmospheric pressure conditions and in a reducing atmosphere. A furnace can be used for this, in which the thermal treatment of the energy storage devices is carried out in batches, as well as a continuous furnace, through which the energy storage devices to be opened up, which is typically a large number of devices situated in one container, are transported. What is special about this method is that the thermal treatment is carried out in a reducing atmosphere. This does not mean that the entire thermal treatment process is to be carried out in a reducing atmosphere in the treatment chamber of the furnace, but that a reducing atmosphere is present at those treatment temperatures at which the electrolyte compounds are vaporized or opened up. As a result of the reducing atmosphere, care must be taken to ensure that the majority of the metals contained in the energy storage devices, such as aluminum, iron, nickel, and cobalt, do not form any oxide compounds. At least iron, nickel and cobalt, if not present as oxides, can be extracted from the material decomposed over the course of the downstream processing in order to separate the valuable material fractions in a simple manner by means of magnetic separation. A method step of opening up the metal oxides, which is otherwise required in the downstream processing, is therefore no longer required or only required for a smaller fraction of the metals, which has a cost-reducing effect with regard to the recycling process.

The reducing atmosphere in the treatment chamber of the furnace is provided by the gaseous evaporation products, but above all by the gaseous decomposition products which develop at a higher temperature following the evaporation phase. Care is taken that none or only an insignificant amount of ambient air penetrates into the treatment chamber during the thermal treatment. In addition, care is taken to ensure that only such an amount of gas is extracted via the suction to the extent that the desired reducing atmosphere is maintained in the treatment chamber. The reducing atmosphere in the treatment chamber also limits the thermal reactivity of the electrochemical energy storage devices. This is used to influence the course of the thermal treatment of the energy storage devices by setting the reducing atmosphere. The more reducing the atmosphere in the treatment chamber of the furnace, the lower the thermal reactivity of the energy storage devices due to the reduced oxygen content. The possible throughput in this method is therefore not limited by the amount of energy storage introduced into the furnace. This method can thus be carried out despite the use of the residual charge contained in the energy storage devices as an energy source for carrying out the thermal treatment, with a significantly greater throughput of energy storage devices to be treated. Due to the control of the thermal reactivity of the energy storage devices described above, the thermal treatment can be carried out under atmospheric pressure conditions and thus also in a continuous furnace. This allows process times to be reduced.

The treatment chamber of the furnace is connected to an exhaust system for extracting gases produced by the thermal treatment. The suction is operated in such a way that a reducing atmosphere remains within the treatment chamber. Against the backdrop that the gas components required to set the reducing atmosphere are generated overall, but at least largely, by the thermal treatment of the energy storage devices themselves, the degree of the reducing atmosphere can be set by setting the volume flow extracted from the treatment chamber of the furnace. If the reducing gases produced by the thermal treatment of the energy storage devices in the treatment space are not sufficient for setting the desired reducing environment within the treatment chamber, a reducing agent, typically in gaseous form, can be introduced into the treatment chamber from the outside.

Typically the thermal treatment is carried out within the treatment chamber with a slight overpressure as compared to the ambient pressure to ensure that possible leaks in the treatment chamber of the furnace do not have a negative impact on the setting of the reducing atmosphere. An overpressure of a few mbar, in particular between 1 to 10 mbar, is considered sufficient. The low overpressure provided in the treatment chamber in such a configuration as compared to the ambient condition is therefore limited to max. 20 mbar, and preferably to max. 10 mbar, so that the reduced atmosphere set in the treatment chamber cannot escape, at least not to a significant extent, due to leakages that may be present. The overpressure in the treatment chamber is set via the suction system, which, as shown above, also sets the atmosphere. For this purpose, there is at least one pressure sensor inside the treatment chamber. The above-mentioned overpressure of 20 mbar, preferably a maximum of 10 mbar, as compared to the ambient pressure is understood, in the context of these explanations, as the term "atmospheric pressure conditions." According to an exemplary embodiment, a pressure which is 5 mbar higher than the ambient pressure is set within the treatment chamber.

The thermal treatment of the energy storage devices to be opened up is generally carried out in several successive temperature stages within the treatment chamber of the furnace. It is provided that the energy storage devices remain in each temperature level for a certain period of time before the thermal treatment is continued in the next temperature level, typically at a higher temperature. This can be done by appropriate temperature control in a furnace operated in batches as well as in a continuous furnace. In a continuous furnace, the individual temperature levels are situated consecutively in the conveying direction of the energy storage devices transported through the furnace. In order to make the furnace path shorter, one exemplary embodiment provides for the energy storage devices to be transported through the furnace cyclically, wherein the energy storage devices typically transported in a container, for example in the manner of a grid box, remain in a temperature level for a certain period of time, before this container is supplied to the next temperature level due to the cyclic conveyance. The energy storage devices are gradually heated up to their maximum temperature in the successive temperature levels.

The advantage of such a design of the method is that the gaseous evaporation and decomposition products of the substances in the energy storage devices are not generated more or less simultaneously or shortly after each other, but rather separate from each other in time. This has advantages for the operation of a thermal post-combustion system, since the hydrocarbons used for this purpose as an energy source for operating the thermal post-combustion system are then supplied to the thermal post-combustion system, distributed over the thermal treatment period. In addition, such a thermal treatment allows the energy storage devices to be opened up, in a first temperature stage, by means of the correspondingly high vapor pressure of the electrolytes that decompose therein, and they escape as a gas phase. This takes place at a temperature of around 160 to 200° C. Evaporation of electrolyte material, such as ethyl methyl carbonate, ethylene carbonate, and/or dimethyl carbonate, prior to further thermal treatment at a higher temperature to decompose existing material allows evaporation products or parts thereof, if desired, to be recovered, for example by condensation typically in a surface condenser. In this way, these substances can also be at least partially recovered from the energy storage devices to be recycled, before the exhaust gases are supplied to the thermal post-combustion system.

The plastic separators, mostly made of polypropylene (PP) or polyethylene (PE), dissolve in the second temperature level, following the first temperature level, which then begins at around 200° C. The beginning pyrolytic decomposition of these products in turn creates process gases with chemically reducing properties. These gases are also extracted and supplied to the thermal post-combustion system. If the separators are sufficiently decomposed, the energy storage cells present in the energy storage devices are short-circuited. This discharge process triggers an exothermic reaction, in which the resulting heat can be used energetically to heat the treatment chamber in the furnace and thus the energy storage devices located therein. The pyrolytic opening in this second temperature zone under reducing conditions leads to the fact that the metals to be recovered as secondary raw materials, in terms of their respective proportion, do not form an oxide compound for the most part. This simplifies the downstream processing.

As a result of the atmospheric environment within the treatment chamber, the heat generated by the residual discharge, in which heat the container containing the electrochemical energy storage devices is circulated, thus intensifies the heating. This reduces the process time required.

The thermal treatment is normally carried out up to a maximum heating temperature which is below the melting temperature of the lowest-melting element to be recovered from the group of metals and transition metals contained in the energy storage devices. Aluminum is typically contained in such energy storage devices. Aluminum is the metal with the lowest melting point from the group of metals to be recovered—Al, Ni, Fe, Co. Therefore, this maximum heating temperature of the electrochemical energy storage devices in the treatment chamber is limited to a temperature that is below the melting temperature of aluminum. In one exemplary embodiment of the method, the energy storage devices to be thermally opened up are only brought to a maximum temperature of approximately 600° C.

In a refinement of such a thermal treatment system with several successive temperature zones, it is provided that the suction can be operated in each temperature zone, independently of that in the adjacent temperature zones. In this way, the reducing atmosphere in each temperature zone can be influenced. It is also possible that a substance supply for supplying a reaction substance opens into each temperature zone in order to influence the thermal treatment and/or to bring secondary raw materials to be recovered into a certain bond.

A furnace wall can be arranged between the individual temperature levels. It does not have to be a lock in this case. If the thermal treatment system is a continuous furnace, one temperature zone can be divided into several heating zones, in which the energy storage devices to be treated thermally are successively heated to the maximum temperature of this heating zone.

It is useful if, after the energy storage devices have been heated to the maximum heating temperature, they are then cooled before they are removed from the furnace. This cooling process can be used to supply a fluid to the cooling, pyrolytically opened material, for example to bring about a conversion of compounds in connection with the pyrolytic opening, whereby the load on subsequent processing is lightened. Such a measure can be useful, for example, with regard to lithium compounds. By introducing $CO_2$ into the furnace during the cooling process, the lithium is bound to lithium carbonate. $CO_2$ is preferably also introduced into the treatment chamber in order to bind released lithium as lithium carbonate in the treatment chamber.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 1 is a block diagram of a thermal treatment system for removing electrolytes and reactive substances in electrochemical energy storage devices.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

The invention is described in the following using an exemplary embodiment with reference made to appended FIG. 1. FIG. 1 shows, in the manner of a block diagram, a thermal treatment system 1 for removing electrolytes and reactive substances in electrochemical energy storage devices, and consequently for pyrolytical opening thereof. The thermal treatment system 1 is used to pyrolytically open up electrochemical energy storage devices as production waste or as end-of-life energy storage devices, in particular lithium-ion batteries, in order to recover secondary raw materials, for example metals, possibly carbon and electrolytes or others, from these energy storage devices. The thermal treatment system 1 is used only for the pyrolytic opening of the energy storage devices. The raw materials to be recovered are separated downstream in a specially designed process. In the downstream processing, the secondary raw materials are recovered from the pyrolytically opened material using methods known per se. The subsequent processing is not shown in the FIGURE.

The thermal treatment system 1 comprises an indirectly heated furnace 2, to which a cooling section 3 is connected or which merges into the cooling section 3 in the illustrated exemplary embodiment. The furnace 2 is designed as a tunnel furnace and the cooling section 3 as a tunnel cooling section. A conveying device, not shown in the FIGURE, conveys pyrolytically opened energy storage devices that are introduced into the furnace 2 through the furnace 2 and the cooling section 3. This can be, for example, a chain conveyor. Ultimately, any conveying device that can withstand the temperatures occurring in the furnace and the gases produced in it can be used for this purpose. There is an entrance lock 4 at the entrance of the furnace 2. There is an exit lock 5 at the exit of the cooling section 3. The transport device extends through the thermal treatment tunnel formed by the furnace 2 and the cooling section 3, from the entry lock 4 to the exit lock 5. There is a closure flap 6 between the entrance lock 4 and the furnace 2, via said closure flap, in its closed position, the furnace interior—the thermal treatment chamber—is sealed gas-tight with respect to the lock 4. An entrance door 7 closes with the lock 4 in its closed position so as to be gas-tight in any case. In the same way, the exit lock 5 at the exit of the cooling section 3 is also sealed off from the environment in a gas-tight manner with a closure flap 8 and with an exit door 9. With the locks 4, 5, the closure flap 6, 8 and/or the door 7, 9 can only be opened if the other respective locking body of respective lock 4 and/or 5 is in its closed position.

The indirect heating of the furnace 2 is realized in that the furnace muffle, the inner wall of which surrounds the treatment chamber, is heated from the outside. The heat given off by the furnace muffle is then radiant heat. At the same time, the furnace muffle is used for the homogeneous distribution of the heat introduced over the circumference of the furnace muffle, or at least the indirect heating of the furnace muffle supports the heat distribution. The furnace muffle can be heated in different ways. In the exemplary embodiment shown, it is provided that electric radiant heaters are directed at the outside of the furnace muffle or attached directly thereto. In addition, fluid paths are supplied, through which the heated gas can be passed, with which gas the furnace muffle and thus the heat required for the thermal radiation can be supplied thereto. The hot gas is generated in a thermal post-combustion system. The furnace 2 is consequently heated at the same time by the thermal post-combustion system. The electrical heating device is used to heat the furnace 2 to its operating temperature. This temperature can be maintained by the thermal energy obtained through thermal post-combustion. Temperature fluctuations in the heating gas originating from the thermal post-combustion system can also be compensated for with the electrical heating device.

The treatment chamber of the furnace 2 is divided into two temperature zones 10, 11. The two temperature zones 10, 11 are separated from one another by a door 12. This door does not have to be gas-tight. In the exemplary embodiment shown, the door 12 serves to isolate the two temperature zones 10, 11 from one another to a certain extent. Temperature zone 10 is in turn divided into three heating zones 10.1, 10.2, 10.3. In the exemplary embodiment shown, temperature zone 11 is likewise divided into three heating zones 11.1, 11.2, 11.3. The temperature in the furnace 2 is lower in temperature zone 10 than in temperature zone 11. Consequently, temperature zone 10 also only needs to be heated to a lower temperature, with the result that the temperature provided for temperature zone 10 can be maintained with a lower amount of heat than in temperature zone 11, with the hot gases generated from thermal post-combustion.

The thermal treatment system 1 also has a suction device 13 with which, when the energy storage devices transported through the furnace 2 are heated, gases that are generated in the course of their heating are extracted. The phrase "suction device" may also be referred to by another combination of the terms "suction, extraction, or exhaust" with "device, system, unit, equipment, or mechanism." In the exemplary embodiment shown, the suction in each temperature zone 10, 11 is not subdivided again with respect to individual heating zones 10.1-10.3 or 11.1-11.3. This is also possible. In the case of the suction device indicated overall by reference numeral 13, gases produced are extracted, in a first suction branch 14, from the part of the treatment chamber assigned to heating zone 10. The second suction branch 15 is used to suction gases from that part of the treatment chamber which is formed by temperature zone 11. Both suction branches 14, 15 are connected to a thermal post-combustion system 16 via suction lines. The suction branch 14 can be operated in such a way that the exhaust gas extracted is supplied directly to the thermal post-combustion system 16. In another operating mode, the gas extracted via the suction branch 14 is passed over a surface condenser 17 in order to recover substances contained in the gas, electrolytes in this case, before the exhaust gas is then supplied to the thermal post-combustion system 16. A heat exchanger 18, by means of which heat generated by the thermal post-combustion system 16 is recovered, is assigned to the thermal post-combustion system 16. As stated above, the recovered heat is used to heat the furnace 2. The indirect heating of the furnace 2 thus takes place through the recovered heat, which is conducted as hot gas through appropriate heating paths in the furnace muffle around the treatment chamber of the furnace 2.

For the sake of clarity, further units which are used for operating the thermal treatment system 1, for example a hydrofluoric acid condenser or the like, are not shown in the FIGURE.

The energy storage devices to be pyrolytically opened in the thermal treatment system are introduced in batches in a container, for example a grid box, in which a large number of such energy storage devices are contained, through the entrance door 7, into the entrance lock 4. The closure flap 6 is closed when the entrance door 7 is open, as shown by the block arrow at the entrance door 7. If such a container is introduced into the lock 4, it is flooded with an inert gas, for example nitrogen. The thermal treatment system 1 is operated cyclically in such a way that the containers located on the conveyor or connected thereto are conveyed in a predetermined cycle over the distance of a heating zone 10.1-10.3, 11.1-11.3, regardless of their position within the thermal treatment system. The direction of transport is indicated by a block arrow T in the FIGURE. Since the furnace 2 shown in the exemplary embodiment has six heating zones 10.1-10.3, 11.1-11.3, six conveying cycles are required so that a container filled with energy storage devices to be pyrolytically opened has passed through the treatment chamber of the furnace 2.

In the first temperature zone 10, the energy storage devices are heated to a temperature of approximately 200° C. in the exemplary embodiment shown. During the passage of a container filled with energy storage devices through heating zones 10.1, 10.2, and 10.3, these heating zones are gradually heated up to the stated temperature, with the container remaining in each heating zone for a certain time according to the specified conveying or heating cycle. At around 160-180° C., which temperature is reached in the second heating zone 10.2, the cells of the energy storage devices open due to the electrolyte's vapor pressure, which is already quite high at this temperature. In the third heating zone 10.3, the energy storage devices reach a temperature of around 200° C. In the first temperature zone 10, there is primarily an evaporation of substances contained in the energy storage devices. These are, in particular, the electrolytes known as ethyl methyl carbonate, ethylene carbonate, and/or dimethyl carbonate. These electrolytes are suctioned out of the treatment chamber via the suction branch 14 and, when the suction branch 14 is operated, at least partially recovered via the condenser 17. The evaporation process is carried out in this part of the treatment chamber of the furnace 2—in temperature zone 10—under slightly increased overpressure compared to the ambient pressure, namely 5 mbar in the exemplary embodiment shown, so that no gases, in particular oxygen, can enter the treatment chamber from the outside. This takes place against the backdrop that the evaporation process is carried out under reducing atmospheric conditions within the treatment chamber. The reducing gases are provided by the evaporation products themselves. It is also entirely possible for a corresponding gas or a gas precursor to be introduced into the first temperature zone of the treatment chamber in order to set the desired reducing atmosphere. A pressure sensor is arranged in the treatment chamber for overpressure control. The pressure provided in the treatment chamber is set by operating the suction devices 13 via their suction branch 14.

A reducing atmosphere is also required in the part of the treatment chamber in which the second temperature zone 11 is located, which is also operated with a slight overpressure of a few mbar, which is 5 mbar in the exemplary embodiment described. The pyrolytic decomposition phase of the remaining constituents of the energy storage devices to be opened up follows the evaporation phase. This takes place in the second temperature zone 11, heating zone 11.1 of which heats the energy storage devices to a temperature of approximately 300 to 350° C. The plastics contained in such an energy storage device, typically PP and/or PE, are decomposed. In addition, the active substances are decomposed. Due to the decomposition of the plastics used as separators, the energy storage devices should not have been fully discharged beforehand—residually discharged by the resulting short-circuits. The resulting thermal energy is used for the heating thereof and of the following heating zones 11.1, 11.2, 11.3. The pyrolytic decomposition produces gases such as carbon monoxide, carbon dioxide, hydrogen, methane, ethane, and cracked gases from the PP/PE decomposition. Methane, ethane, and the cracked gases are hydrocarbon compounds that are supplied to the thermal post-combustion system 16 via the suction branch 15 and are burned there to obtain heat for heating the furnace. The exhaust gases are cleaned by the combustion process in the thermal post-combustion system 16. The reducing atmosphere in the second temperature zone 11, which is also generated automatically by the decomposition products, is maintained so that the metals released by the decomposition process do not form any oxidic compounds. Studies have shown that this measure significantly reduces the proportion of metal oxides in the pyrolytically opened material as compared to other opening methods. In the downstream processing, the non-oxide metal compounds can at least for the most part be separated from the opened material in a simple manner by a magnetic separator after a preceding decomposing process.

In order to set the reducing atmosphere in the treatment chamber of the furnace 2, the suction device 13, with its suction branches 14, 15, is operated accordingly. This means that only such an exhaust gas volume flow is extracted from the respective part of the treatment chamber of the furnace 2 to the extent that the reducing atmosphere and the slight overpressure are maintained as desired. For this purpose, sensors 22 are installed in the temperature zones 10, 11, by means of which the setting of the reducing atmosphere is controlled (not shown in the FIGURE). These can be oxygen sensors, for example. These sensors are connected to a central control device via which the thermal treatment system is controlled. At the same time, residual discharges occurring primarily in temperature zone 10 are controlled by the reducing atmosphere. The energy storage devices to be opened up in the second temperature zone 11 are heated up to a temperature of approximately 600° C. This temperature is well below the melting temperature of aluminum (approx. 660° C.) as a low-melting metal from the group of metals and transition metals in the energy storage devices to be thermally opened. This aluminum is therefore not melted in the pyrolytic opening, which is advantageous for the downstream processing.

$CO_2$ is introduced into the second temperature zone 11 of the treatment chamber so that at least some of the metals to be recovered are bound, such as lithium as carbonates, for example lithium carbonate.

The treatment chamber of the furnace 2 is separated from the cooling section 3 by a gas-tight door 19. Due to the overpressure operation of the furnace 2 in its treatment chamber, care is taken that hardly any cooler air and also no oxygen enter the treatment chamber when the door 19 is opened briefly to allow a container to pass through. In the cooling section 3, the pyrolytically opened energy storage devices are cooled down to ambient temperature. In principle, this is a safety measure. However, this measure allows the pyrolytically opened energy storage devices brought out of the exit lock 5 from the thermal treatment system 1 to be supplied immediately for further processing. This is harmless due to the pyrolytic opening and the resulting inactivation of the electrolytes and the reactive substances.

In the exemplary embodiment shown, a third suction branch 20 of the suction device 13 is connected to the cooling section 3. In addition, a substance supply 21 opens into the cooling section 3, via which substance supply a substance can be supplied for influencing the pyrolytically opened material. If desired, an additional coolant, for example water, can be added. It goes without saying that several substance supplies can open into the cooling section 3. One embodiment provides that $CO_2$ is supplied via such a substance supply 21 in order to convert metals to be recovered in the pyrolytically opened material, in particular the lithium present, into a metastable compound, into a metastable lithium compound in the case of lithium. This facilitates the separation of the lithium in the downstream processing. Substance supplies can also be provided in the temperature zones 10, 11 of the treatment chamber of the furnace 2 if the atmosphere and/or the evaporation or decomposition process is to be influenced.

During the thermal treatment of the energy storage devices to be opened up, the residual discharge thereof in the first temperature zone 10 is used to heat the same. In order to bring about a similar thermal energy supply in a continuous pyrolytic opening process by means of the residual discharge in the successive containers, the energy storage devices located in such a container are of different properties, i.e. there are differently designed energy storage devices therein, namely different with regard to their electrical storage density and their residual charge. It goes without saying that the thermal treatment system 1 can also be used to pyrolytically open containers with single-type energy storage devices.

The thermal treatment system 1 is operated with regard to its temperature control in such a way that the treatment chamber of the furnace 2, the cooling section 3, and the locks 4, 5 are kept above the dew point of hydrofluoric acid. The hydrofluoric acid formed is extracted from the treatment chamber via the suction device 13 and removed from the exhaust gas in an absorber downstream of the thermal post-combustion system. In the exemplary embodiment described, a calcium carbonate bed is used for this, in which the condensed hydrofluoric acid is converted into salts.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure.

In general the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 Thermal treatment system
2 Furnace
3 Cooling section
4 Entrance lock
5 Exit lock
6 Closure flap
7 Entrance door
8 Closure flap
9 Exit door
10 First temperature zone
10.1, 10.2, 10.3 Heating zone
11 Second temperature zone
11.1, 11.2, 11.3 Heating zone
12 Door
13 Suction device
14 Suction branch
15 Suction branch
16 Thermal post-combustion system
17 Condenser
18 Heat exchanger
19 Door
20 Suction branch
21 Substance supply
22 Sensor
T Block arrow, transport direction

We claim:

1. A method for opening up electrochemical energy storage devices in connection with a subsequent recovery of valuable materials contained therein as secondary raw materials, in which method the energy storage devices are opened up by a thermal treatment system to remove electrolytes and reactive substances before such thermally treated material is subjected to processing in a downstream process, by means of said downstream processing the secondary raw materials in the thermally treated material are separated from one another, the method comprising:
    implementing a thermal treatment process in an indirectly heated furnace under atmospheric pressure conditions or a slight overpressure relative to ambient pressure of up to 20 mbar and in a reducing atmosphere, the furnace having at least one treatment chamber with at least one suction branch line connected thereto for removing gases resulting from the thermal treatment process, wherein the course of the thermal treatment process is influenced by the reducing atmosphere as a control variable,
    wherein the thermal treatment process is carried out in successive temperature zones, and the energy storage devices remain in each temperature zone for a certain period of time before the thermal treatment process is continued in the next temperature zone,
    wherein the reducing atmosphere in the furnace is controlled by setting a volume flow of gases extracted from the treatment chamber through the at least one suction branch line, whereas the reducing atmosphere in each temperature zone is independently controllable with respect to another temperature zone by independently setting the volume flow for the respective temperature zone, and
    wherein, when reducing gases produced from thermal treatment of the energy storage devices are insufficient for setting a desired reducing atmosphere within the treatment chamber, a reducing agent in gaseous form is introduced into the treatment chamber.

2. The method of claim 1, wherein gases extracted from the furnace are supplied to a thermal post-combustion system, and heat from the extracted gases is used to heat the furnace via a heat exchanger.

3. The method of claim 1, wherein, in a first temperature zone, the energy storage devices are heated in order to evaporate organic electrolyte material contained therein and, in a subsequent temperature zone, further thermal opening is carried out at a temperature which is higher than in the first temperature zone, in order to decompose evaporation products and/or product residues and existing plastics resulting from the first temperature zone.

4. The method of claim 1, wherein, following a final temperature zone in which the energy storage devices are heated to their maximum temperature, the thermally opened energy storage devices are cooled.

5. The method of claim 1, wherein evaporation and/or decomposition products contained in gases extracted from the furnace are recovered from the extracted gas by means of condensation.

6. The method of claim 5, wherein the evaporation and/or decomposition products recovered by condensation include electrolytes.

7. The method of claim 1, wherein reaction substances are introduced into a treatment chamber of the furnace or into a cooling section in order to influence the thermal treatment process.

8. The method of claim 1, wherein a tunnel furnace designed as a continuous furnace is used as the furnace through which the energy storage devices to be thermally opened are transported in containers.

9. The method of claim 1, wherein processing of the thermally opened, inactivated energy storage devices is implemented downstream of the thermal treatment process in order to recover the secondary raw materials contained in the energy storage devices that remain after the thermal treatment process.

10. A thermal treatment system for carrying out the method according to claim 1 for removing electrolytes and reactive substances in electrochemical energy storage devices, the thermal treatment system comprising:
    an indirectly heated furnace with at least one treatment chamber that is atmospherically separated from an environment surrounding the furnace;
    at least one lock for supplying the treatment chamber and for removing the thermally treated material;
    a suction branch line connected to the treatment chamber for removing gaseous products of the electrochemical energy storage devices that result during the thermal treatment process from the treatment chamber;
    a thermal post-combustion system for cleaning the gaseous products suctioned out of the treatment chamber, wherein the thermal post-combustion system includes a heat exchanger for recovering heat from the gaseous products to heat the treatment chamber;
    a sensor for monitoring an atmosphere prevailing in the treatment chamber with regard to reducing atmospheric conditions desired therein; and
    a substance supply that opens into the treatment chamber and through which substances are suppliable for influencing the thermal treatment process of the energy storage devices.

11. The thermal treatment system of claim 10, wherein the furnace is a tunnel furnace designed as a continuous furnace with successive temperature zones of different heating temperature arranged in a conveying direction of the energy storage devices to be treated thermally.

12. The thermal treatment system of claim 11, wherein a first temperature zone is provided for heating the energy storage devices to be opened up to an electrolyte evaporation temperature, and wherein the suction branch line connects the treatment chamber to a condenser in order to condense evaporated electrolyte material in the gaseous products extracted from the first temperature zone.

13. The thermal treatment system of claim 12, further comprising a cooling section arranged after a final temperature zone in which the electrochemical energy storage devices to be treated thermally are heated to their maximum temperature.

* * * * *